(12) United States Patent
Kraft et al.

(10) Patent No.: US 11,935,717 B2
(45) Date of Patent: Mar. 19, 2024

(54) ARRANGEMENT FOR CONNECTING A CIRCUIT BREAKER TO A CONDUCTING LAYER OF A LAMINATED BUSBAR AND SWITCHGEAR COMPRISING SUCH AN ARRANGEMENT

(71) Applicant: ABB Schweiz AG, Baden (CH)

(72) Inventors: Klaus Kraft, Heidelberg (DE); Oleksandr Sologubenko, Bonstetten (CH); Patrik Kaufmann, Baden (CH); Francoise Molitor, Zurich (CH); Maciej Mruczek, Cracow (PL); Libor Vitek, Namest nad Oslavou (CZ); Jindrich Janos, Brno (CZ)

(73) Assignee: ABB Schweiz AG, Baden (CH)

( * ) Notice: Subject to any disclaimer, the term of this patent is extended or adjusted under 35 U.S.C. 154(b) by 756 days.

(21) Appl. No.: 17/067,785

(22) Filed: Oct. 12, 2020

(65) Prior Publication Data
US 2021/0027966 A1 Jan. 28, 2021

Related U.S. Application Data

(63) Continuation of application No. PCT/EP2018/059567, filed on Apr. 13, 2018.

(51) Int. Cl.
*H01H 71/02* (2006.01)
*H02B 1/20* (2006.01)

(52) U.S. Cl.
CPC .......... *H01H 71/0221* (2013.01); *H02B 1/20* (2013.01)

(58) Field of Classification Search
CPC ... H02H 7/22; H02B 1/00; H02B 1/20; H01B 17/00; H01B 17/14; H01B 17/16;
(Continued)

(56) References Cited

U.S. PATENT DOCUMENTS 3,400,303 A * 9/1968 Rowlands ................ H02B 1/20
174/72 B
4,358,633 A 11/1982 Reynolds, Jr.

FOREIGN PATENT DOCUMENTS

CN 201478466 U 5/2010
CN 106207505 A 12/2016
(Continued)

*Primary Examiner* — Anthony R Jimenez
(74) *Attorney, Agent, or Firm* — Leydig, Voit & Mayer, Ltd.

(57) ABSTRACT

An arrangement for electrically connecting a circuit breaker to a laminated busbar in a switch gear cabinet in which the circuit breaker has at least one terminal to be contacted by a connecting bar and in which the laminated busbar includes at least one conducting layer for conducting electric current which is covered by adjoining insulating layers attached thereto, the arrangement including: a first cylindrical connecting element and a second cylindrical connecting element which are arranged at a distance to each other at the conducting layer and project away from the conducting layer; an electrically conducting distribution bar which is mounted to free end portions of the first and second cylindrical connecting elements; and a terminal member which is mounted to the distribution bar at a center between the first and second cylindrical connecting elements. The terminal member is to be contacted by the connecting bar.

11 Claims, 3 Drawing Sheets

(58) Field of Classification Search
CPC ........ H01B 17/17; H01B 17/18; H01R 25/00; H01R 25/16; H01R 25/161; H01R 25/162; H01R 11/00; H01R 11/01; H01R 11/26; H01R 9/00; H01R 9/15; H01R 9/16; H01R 9/18; H01R 9/20; H01R 9/22; H01R 9/226; H01R 9/24; H01R 9/2408; H01R 9/2416; H01R 9/2425; H01R 9/2466; H01R 9/26; H01R 9/2608; H01R 9/2625; H01R 9/2641; H01R 9/2633; H01R 9/2675; H01R 9/2691; H01R 9/28; H01H 2009/20; H01H 2009/26; H01H 2009/265; H01H 2009/267; H01H 2009/28; H01H 71/00; H01H 71/02; H01H 71/0214; H01H 71/0221; H01H 71/0271; H01H 71/08; H01H 2203/34
USPC ....................................................... 200/293
See application file for complete search history.

(56) References Cited

FOREIGN PATENT DOCUMENTS

| | | |
|---|---|---|
| DE | 102005015945 A1 | 10/2006 |
| EP | 2256767 A2 | 12/2010 |
| GB | 1030283 A | 5/1966 |
| GB | 2187034 A | 8/1987 |
| TW | M549475 U | 9/2017 |
| WO | WO 2012135673 A2 | 10/2012 |
| WO | WO 2013166562 A1 | 11/2013 |
| WO | WO 2017081656 A1 | 5/2017 |

* cited by examiner

ARRANGEMENT FOR CONNECTING A CIRCUIT BREAKER TO A CONDUCTING LAYER OF A LAMINATED BUSBAR AND SWITCHGEAR COMPRISING SUCH AN ARRANGEMENT

CROSS-REFERENCE TO PRIOR APPLICATION

This application is a continuation of International Patent Application No. PCT/EP2018/059567, filed on Apr. 13, 2018, the entire disclosure of which is hereby incorporated by reference herein.

FIELD

The invention is related to an arrangement for connecting a circuit breaker to a conducting layer of a laminated busbar and a switchgear comprising such an arrangement.

BACKGROUND

Multi-phase busbars are used in switchgears to conduct and distribute alternating electrical current to different electrical devices which are usually installed in switch gear cabinets. In order to provide for the possibility to conduct all three phases or even more phases of an alternating current in a single busbar, multi-phase busbars have been developed which comprise a base layer and a cover layer of electrically insulating material between which two or more layers of conducting sheet metal, in particular copper, are arranged which are electrically insulated from each other by means of insulating intermediate layers.

An afore-described busbar in which the different layers are laminated to each other by means of liquid resin is described in DE 10 2005 015 945 B4 of the applicant. The laminated busbar has the advantage that it is compact and does not tend to delaminate due to repellant forces which are generated by the alternating electric currents that are conducted in the different conducting layers for each phase and which in case of a short circuit can be in the range of several thousand ampere (kA).

In the currently available low voltage switch gear systems, the connection of circuit breakers is usually done by means of flat copper bars which are connected to the main busbar system which is usually located at the rear side, top or bottom of the switch gear cabinets. As these connections are basically point to point connections which have one connection at the ACB (Air Circuit Breaker) terminal of the circuit breaker and a second connection at the busbar system, the above-described known circuit breakers cannot be directly connected to the connecting pins of laminated busbars as described herein before, which project out from the conducting layers of each electrical phase through the adjoining insulating layers into the interior space of the switchgear cabinet.

SUMMARY

In an embodiment, the present invention provides an arrangement for electrically connecting a circuit breaker to a laminated busbar in a switch gear cabinet in which the circuit breaker has at least one terminal which is configured to be contacted by a connecting bar and in which the laminated busbar comprises at least one conducting layer for conducting electric current which is covered by adjoining insulating layers attached thereto, the arrangement comprising: a first cylindrical connecting element and a second cylindrical connecting element which are arranged at a distance to each other at the conducting layer and project away from the conducting layer; an electrically conducting distribution bar which is mounted to free end portions of the first and second cylindrical connecting elements; and a terminal member which is mounted to the distribution bar at a center between the first and second cylindrical connecting elements, the terminal member being configured to be contacted by the connecting bar for interconnecting the terminal member with the at least one terminal of the circuit breaker.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
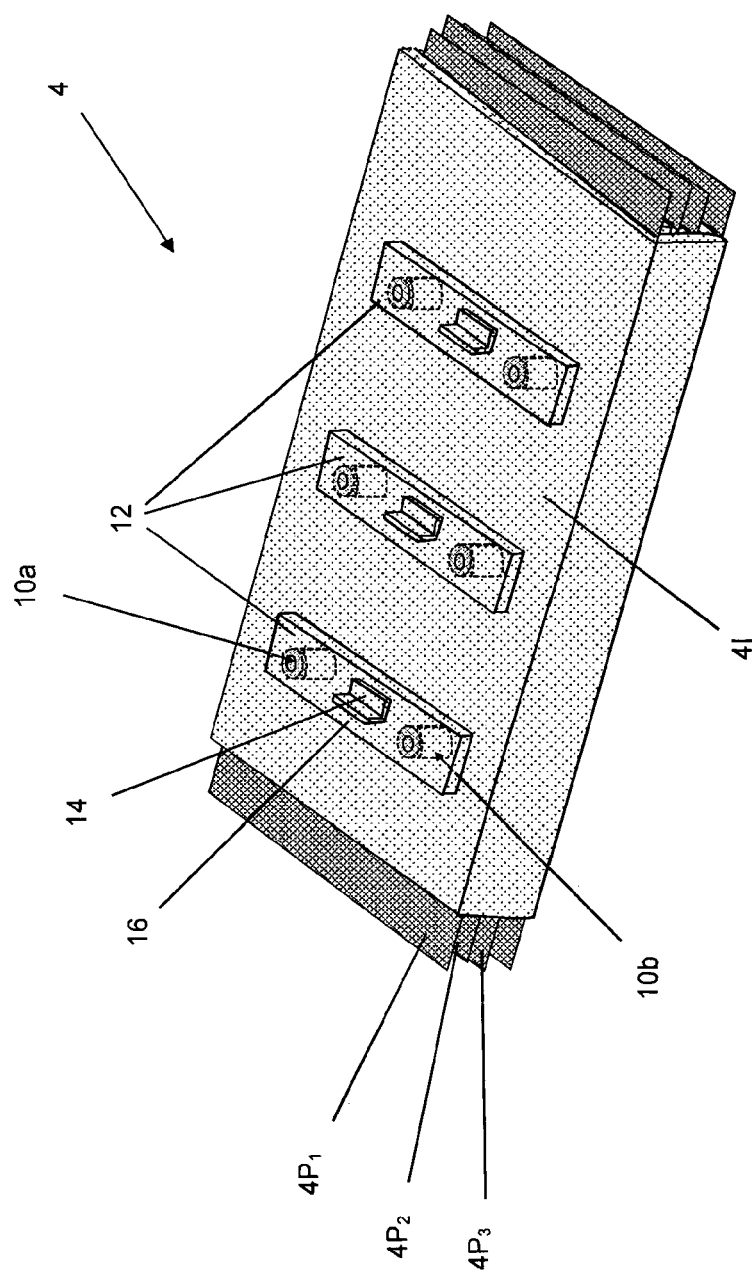
FIG. 1 is a schematical view of an exemplary embodiment of a laminated busbar with four conducting layers and three distribution bars and terminal members for each of the three electrical phases which are connected to an associated conducting layer of the laminated busbar by means of a first and a second cylindrical connecting element, respectively.

In an embodiment, the present invention provides an arrangement which allows an easy and fast installation of known circuit breakers having flat bar-shaped connection terminals at its rear side to laminated busbar systems.

In an embodiment, the present invention provides a switch gear with a laminated busbar which includes such an arrangement.

According to the invention, an arrangement for electrically connecting a circuit breaker to a laminated busbar in a switch gear, in particular a low voltage switchgear, in which the circuit breaker has at least one terminal which is adapted to be contacted by a connecting bar and wherein the laminated busbar comprises at least one conducting layer for conducting an electric alternating current which is covered by adjoining insulating layers attached thereto, comprises a first cylindrical conducting element and a second cylindrical connecting element which are made of an electrically conducting material, preferably copper or aluminium. The first and second cylindrical connecting element are arranged at the conducting layer of the laminated busbar at a distance to each other, so that the free end portion of the cylindrical connecting elements project away from the conducting layer. The arrangement according to the invention is wherein it further includes an electrically conducting distribution bar which is mounted to the free end portions of the first and second cylindrical connecting elements, and a terminal member that is mounted to the distribution bar preferably in the center between the first and the second cylindrical connecting elements, that is at half of the distance the connecting elements are spaced apart from each other. The terminal member is adapted to be contacted by the connecting bar for electrically interconnecting the terminal member to an associated terminal of the circuit breaker. In the preferred embodiment, the first and the second cylindrical connecting elements, the electrically conducting distribution bar and the terminal member mounted thereto which are comprised by the arrangement of the present invention are made of copper or aluminium, and the terminal member mounted to the distribution bar have a similar shape to the terminals of the circuit breaker, in order to simplify the design of the arrangement.

The first and the second cylindrical connecting elements have a diameter which depends on the nominal current value of the circuit breaker and which may lie in the range of several tens of millimetres, in particular in the range of 30 mm, for circuit breakers having a nominal maximum current of 6 kA. The center-to-center distance of the first and second cylindrical connecting elements is preferably in the range 150 mm, and the height of the cylindrical connecting elements may be in the range of several tens of millimetres, in particular in the range of 40 mm. However, the dimensions of the cylindrical connecting elements may also be smaller if the maximum currents in the low voltage switch gears are lower, but may also be larger in case of higher maximum currents. Moreover, the cylindrical connecting elements may be copper or aluminium cylinders which may optionally be coated with an insulating coating.

The invention provides for the advantage that due to the central position of the terminal element in the center between the first and the second cylindrical connecting element, the electric current flowing through the connecting bar is split up and distributed and symmetrically conducted by the distribution bar to the associated conducting layer of the laminated busbar via the two cylindrical connecting elements. This results in an average reduction of the current at the contacting points between the conducting layer of the laminated busbar and the cylindrical connecting elements by about 50%, which allows for higher currents to be transferred via the laminated busbar.

Another advantage which is obtained by the arrangement according to the present invention can be seen in that the heat which is generated by the circuit breaker is efficiently conducted to the copper conducting layers of the laminated busbar due to the short distance between the distribution bar and the conducting layer of the laminated busbar which can be obtained with the arrangement of the present invention if desired.

Due to the increased dissipation of thermal energy via the conducting layers of the laminated busbar which may form the rear plane or rear wall of the switch gear or switch gear cabinet, the heat which is generated by the circuit breakers may be conducted efficiently away from the interior of a switch gear and out of a switch gear cabinet. In other words, the copper plates of the conducting layers of the laminated busbar as well as the distribution bar serve as cooling fins for conducting heat which in turn reduces the temperature of the circuit breaker and thus increases the lifetime thereof.

According to a further object of the present invention, each of the first and second cylindrical connecting elements comprises a first bore or hole with an internal thread which is adapted to receive the threaded end portion of a screw which projects through a hole that is formed in the electrically conducting distribution bar for clamping the distribution bar to the first and second cylindrical connecting element, respectively.

In the same way, each of the first and second cylindrical connecting elements preferably also comprises a second bore or second hole with an internal thread which is adapted to receive a threaded end portion of a further screw. For mounting the second cylindrical connecting element to the associated conducting layer, the further screw projects through a hole in the conducting layer of the laminated busbar to which the terminal of the circuit breaker is to be electrically connected. In order to connect the first and second cylindrical connecting elements to the desired conducting layer of the busbar, a blind hole may be provided in all further layers of the laminated busbar, on either side of the conducting layer to which the first and second cylindrical connecting elements are mounted. If not used, the prefabricated blind holes may be filled out with a plug of insulting material, in order to avoid a direct access to and any creeping current or even sparking between two or more of the further conducting layers of the busbar. Usually, a laminated busbar comprises three conducting layers for the three electrical phases of an alternating current and at least one further conducting layer to which protective earth (PE) of an alternating current is electrically connected.

According to another object of the present invention, the distribution bar may be an L-shaped profile bar having a first and a second flank, one of which is screwed to the first and second cylindrical connecting elements, as described herein before. The other flank serves as a terminal member for connecting the connecting bar. As L-shaped copper profiles may be obtained as stock material, this design allows for reduced production costs and a highly flexible positioning of the connecting bars at any desired position at the connecting flank of the L-shaped copper profile of the terminal member which projects away from the busbar.

As an alternative to the afore-described embodiment, the distribution bar can also be provided as a flat bar, preferably a flat copper or aluminium bar, which is directly screwed to the end portions of the first and second cylindrical connecting elements which project away from the busbar. In this embodiment, the terminal member may be an L-shaped or T-shaped profile, preferably a copper or aluminium profile, which is directly mounted to the flat bar. For mounting the L-shaped profile or T-shaped profile, any known mounting technology may be used, including, but not limited to, electric welding, screwing or mechanically clamping compression fitting of the L-shaped or T-shaped profile to the flat distribution bar which is preferably made of the same electrically conducting material. This embodiment provides for the advantage that in case of high currents which have to be conducted to or away from the associated terminal of the circuit breaker, the L-shaped profile or T-shaped profile can be produced with a shorter length but higher material thickness, so that the material costs are reduced and the resistance of the arrangement against over currents is increased.

According to another embodiment of the present invention which provides for a highly flexible connection of circuit breakers at different locations remote from the distribution bar, the connecting bar may be configured as a cranked and/or curved and/or angled connecting bar, the length and shape of which is individually configured in dependence of the position of the circuit breaker in the switch gear or switch gear cabinet, respectively. In this embodiment, the terminal member is adapted to be contacted by this individually configured cranked and/or curved and/or angled connecting bar. This embodiment provides for the further advantage that different types of circuit breakers with two or more connecting terminals can be easily and quickly mounted to the busbar even if the spacing between two or more of the circuit breaker terminals varies between different types of circuit breakers.

The same applies if the terminals of different embodiments of circuit breakers are positioned at different height levels relative to the mounting position of the laminated bus bar or distribution bar, so that the arrangement of the present invention allows for a highly flexible mounting position and terminal spacing of the circuit breakers to be connected to the laminated busbar.

According to yet another object of the present invention, the laminated busbar comprises at least two conducting layers wherein each of the at least two conducting layers is connectable to a different terminal of a circuit breaker by means of at least two cylindrical connecting elements mounted to each of the conducting layers. In this embodiment an associated distribution bar as described herein before is mounted to each pair of cylindrical connecting elements by means of screws or by means of clamping.

Moreover, in order to increase the maximum current and thermal energy which can be transmitted from a terminal of the circuit breaker to the respective conducting layer of the busbar, there may be provided more than two cylindrical connecting elements, preferably three, four or five cylindrical connecting elements, which are all bridged and interconnected to one and the same distribution bar for one electrical phase of the AC current. In this embodiment, the terminal member is preferably attached to the distribution bar in the center of a virtual line which interconnects two of the cylindrical connecting elements. The position of the terminal member in case of 5 cylindrical connecting elements which are located relative to each other in a row at equal distances may be in the center between the second and third cylindrical connecting element.

According to a further object of the invention, the connecting bar may comprise clamping elements, by means of which the end portions of the connecting bar can be mechanically clamped to the terminal of the circuit breaker and the terminal member mounted to the distribution bar, respectively. The clamping elements may be two plate shaped elements of a desired shape which are clamped to each other and to the terminal by means of screws which extend through bores in two opposing plate shaped clamping elements.

According to another aspect of the present invention, the afore-described arrangement is installed in a switch gear cabinet which includes a laminated busbar of the aforementioned type and at least one circuit breaker which is electrically connected to this busbar by means of the arrangement.

In this embodiment of the invention, the busbar may advantageously form the rear wall or the back plane of a switch gear or switch gear cabinet, in which the circuit breaker and other electrical components can be installed.

Furthermore, in another embodiment of the invention instead of copper aluminium may be used and applied also.

Figure 2:
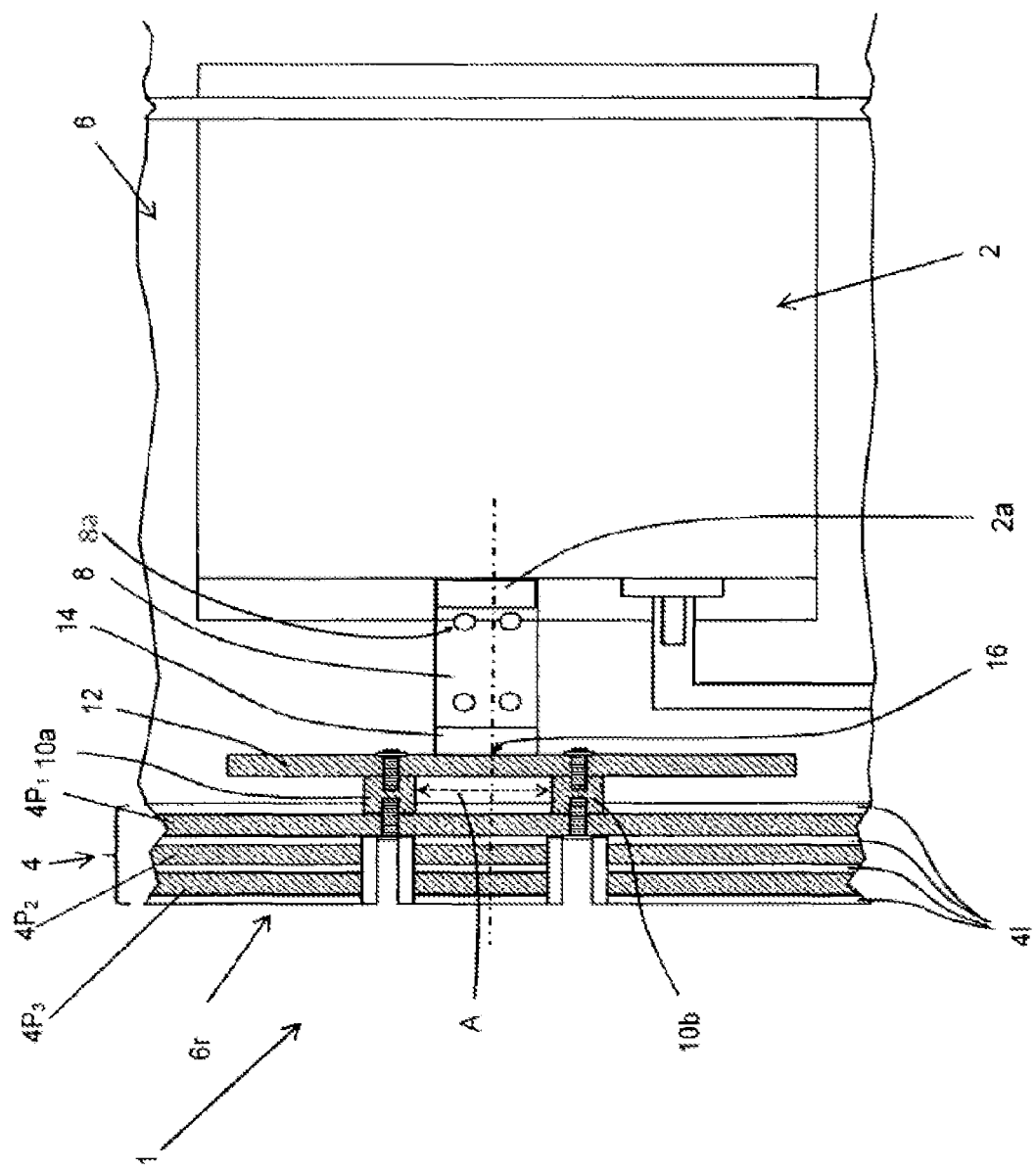
FIG. 2 is a schematical partial view of a switch gear cabinet with a laminated busbar which forms the rear wall of the switch gear cabinet and an exemplary embodiment of a circuit breaker which is electrically connected to the laminated busbar by means of an arrangement according to the present invention.
Figure 3:
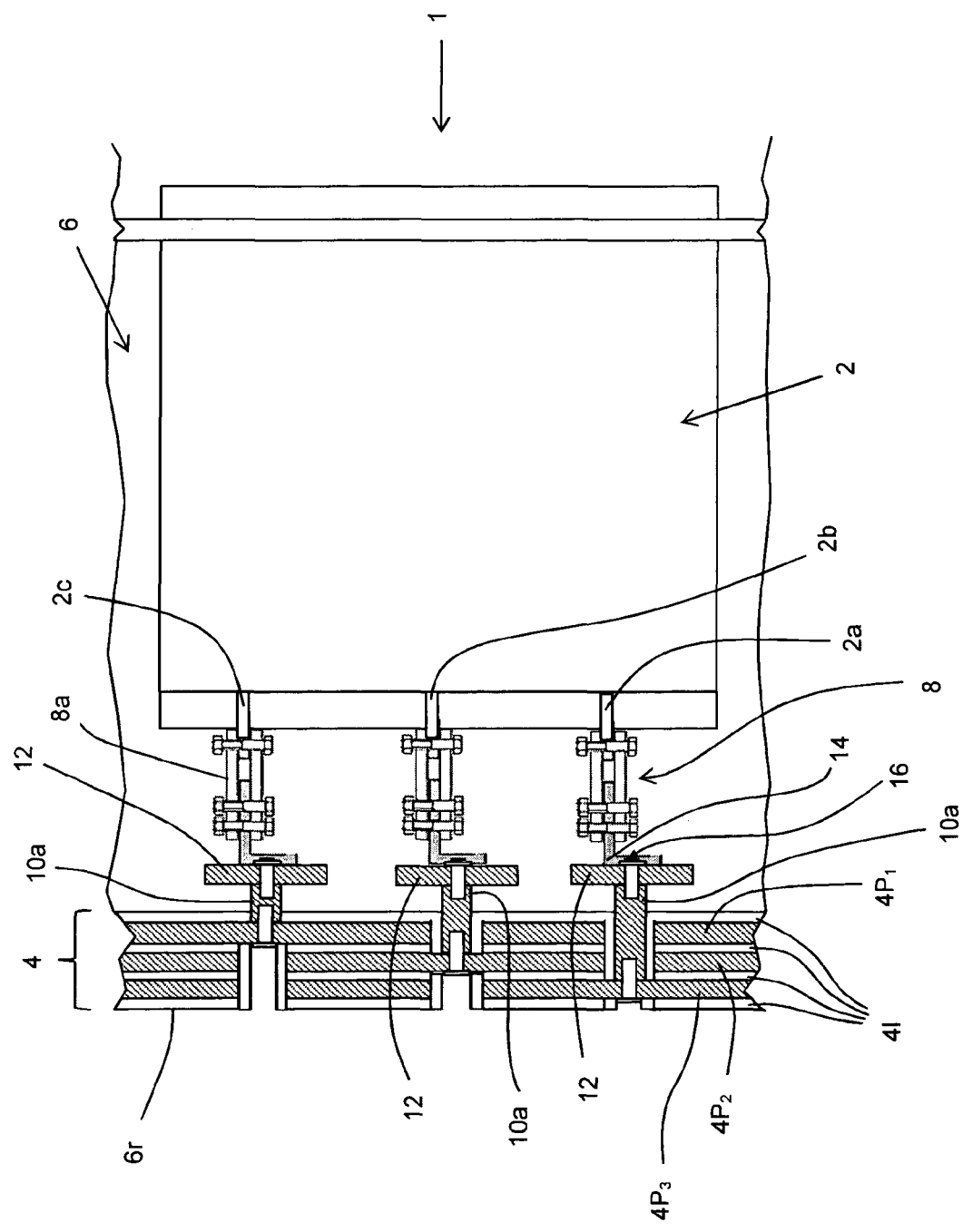
FIG. 3 is a top view of the circuit breaker of FIG. 2 illustrating the electrical connection between the three terminals of the circuit breaker and the associated conducting layer of the busbar.

As it is shown in FIG. 1, a laminated busbar 4 which may be installed as a rear wall 6r in a switch gear cabinet 6 as shown in FIGS. 2 and 3, comprises three conducting layers 4P1, 4P2, 4P3 for each phase of the electric current to be distributed by the laminated busbar 4. The three conducting layers 4P1, 4P2, 4P3 are electrically separated from each other by adjoining insulating layers 4I, in order to electrically insulate the layers from each other. As it can further be taken from FIGS. 1, 2 and 3, an arrangement 1 of the present invention for connecting the terminals 2a, 2b and 2c of the circuit breaker 2 to the associated conducting layer 4P1, 4P2, 4P3 of the laminated busbar 4 comprises a first cylindrical connecting element 10a and a second cylindrical connecting element 10b which are fixedly mounted to the associated conducting layer 4P1, 4P2, 4P3 at a distance A to each other. The arrangement 1 further includes an electrically conducting distribution bar 12 which is mounted to the free end portions of each pair of first and second cylindrical connecting elements 10a, 10b for a respective phase.

The distribution bar 12 is a flat bar, and an L-shaped terminal member 14 is mounted to the distribution bar 12 at the center 16 between the first and the second cylindrical connecting elements 10a, 10b and provides a terminal of the busbar 4 which is adapted to be contacted by a connecting bar 8 interconnecting the terminal member 14 for each phase with a terminal 2a, 2b, 2c of the circuit breaker 2, as it is shown in FIG. 3.

For connecting the distribution bar 12 to the plane end surface of the first and second cylindrical connecting element 10a, 10b which faces away from the laminated busbar 4, each of the connecting elements 10a, 10b comprises a first internally threaded bore which is adapted to receive a threaded end portion of an associated screw, which extends through a hole formed in the distribution bar 12, as it is shown in FIGS. 2 and 3.

In the same way, for mounting the first and second cylindrical connecting element 10a, 10b to a conducting layer 4P1, 4P2, 4P3 of the laminated busbar 4, each of the connecting elements 10a, 10b comprises a second internally threaded bore in its plane end surface which abuts the outer side of an associated conducting layer 4P1, 4P2, 4P3. The second screw extends through a hole which is formed in the associated conducting layer 4P1, 4P2, 4P3, as it is shown in FIGS. 2 and 3.

As it can further be seen from FIG. 3, each of the connecting bars 8 comprises clamping elements 8a which are clamped to the terminals 2a, 2b, 2c of the circuit breaker 2 and the flanks of the L-shaped terminal members 14 which are mounted to the center 16 of each distribution bar 12.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS 1 arrangement
2 circuit breaker
2a, b, c terminals of circuit breaker
4 laminated busbar
4I insulating layers
$4P_1$ first conducting layer
$4P_2$ second conducting layer
$4P_3$ third conducting layer
6 switch gear cabinet
6r rear wall of switch gear cabinet
8 connecting bar
8a clamping element
10a first cylindrical connecting element
10b second cylindrical connecting element
12 distribution bar
14 terminal member
16 center
A distance between first and second cylindrical connecting element

What is claimed is:

1. An arrangement for electrically connecting a circuit breaker to a laminated busbar in a switch gear cabinet in which the circuit breaker has at least one terminal which is configured to be contacted by a connecting bar and in which the laminated busbar comprises at least one conducting layer for conducting electric current which is covered by adjoining insulating layers attached thereto, the arrangement comprising:
   a first cylindrical connecting element and a second cylindrical connecting element which are arranged at a distance from each other at the conducting layer and project away from the conducting layer;
   an electrically conducting distribution bar which is mounted to free end portions of the first and second cylindrical connecting elements; and
   a terminal member which is mounted to the distribution bar at a center between the first and second cylindrical connecting elements, the terminal member being configured to be contacted by the connecting bar for interconnecting the terminal member with the at least one terminal of the circuit breaker.

2. The arrangement according to claim 1, wherein the distribution bar comprises an L-shaped profile bar, and wherein the terminal member comprises a flank of the L-shaped profile bar.

3. The arrangement according to claim 1, wherein the distribution bar comprises a flat bar, and
   wherein the terminal member comprises an L-shaped profile which is mounted to the flat bar.

4. The arrangement according to claim 1, wherein the distribution bar comprises a flat bar, and
   wherein the terminal member comprises a T-shaped profile which is mounted to the flat bar.

5. The arrangement according to claim 1, wherein the terminal member is configured to be contacted by a cranked and/or curved and/or angled connecting bar.

6. The arrangement according to claim 1, wherein the laminated bus bar comprises at least two conducting layers for different electrical phases of an alternating current, and
   wherein each of the at least two conducting layers is connectable to a different terminal of a circuit breaker by the first and second cylindrical connecting elements mounted to each of the at least two conducting layers and an associated distribution bar mounted to the first and second cylindrical connecting elements.

7. The arrangement according to claim 1, wherein the connecting bar comprises clamping elements configured to mechanically clamp the connecting bar to the terminal member.

8. A switch gear, comprising:
   a laminated busbar;
   a circuit breaker; and
   the arrangement for electrically connecting the circuit breaker to the laminated busbar according to claim 1.

9. The switch gear according to claim 8, wherein the laminated busbar forms a rear wall of the switch gear cabinet.

10. The arrangement according to claim 1, wherein each of the first cylindrical connecting element and the second cylindrical connecting element comprises a first bore with an internal thread, the first bore being configured to receive a threaded end portion of a screw projecting through a hole formed in the electrically conducting distribution bar to clamp the distribution bar to the first and second cylindrical connecting element.

11. The arrangement according to claim 10, wherein each of the first cylindrical connecting element and the second cylindrical connecting element comprises a second bore with an internal thread, the second bore being configured to receive a threaded end portion of a screw projecting through a hole formed in the conducting layer of the laminated bus bar.

* * * * *